Dec. 4, 1962 R. R. GUNDERSON 3,066,577
REFLECTING SIGNAL MARKER
Filed March 2, 1960 3 Sheets-Sheet 1
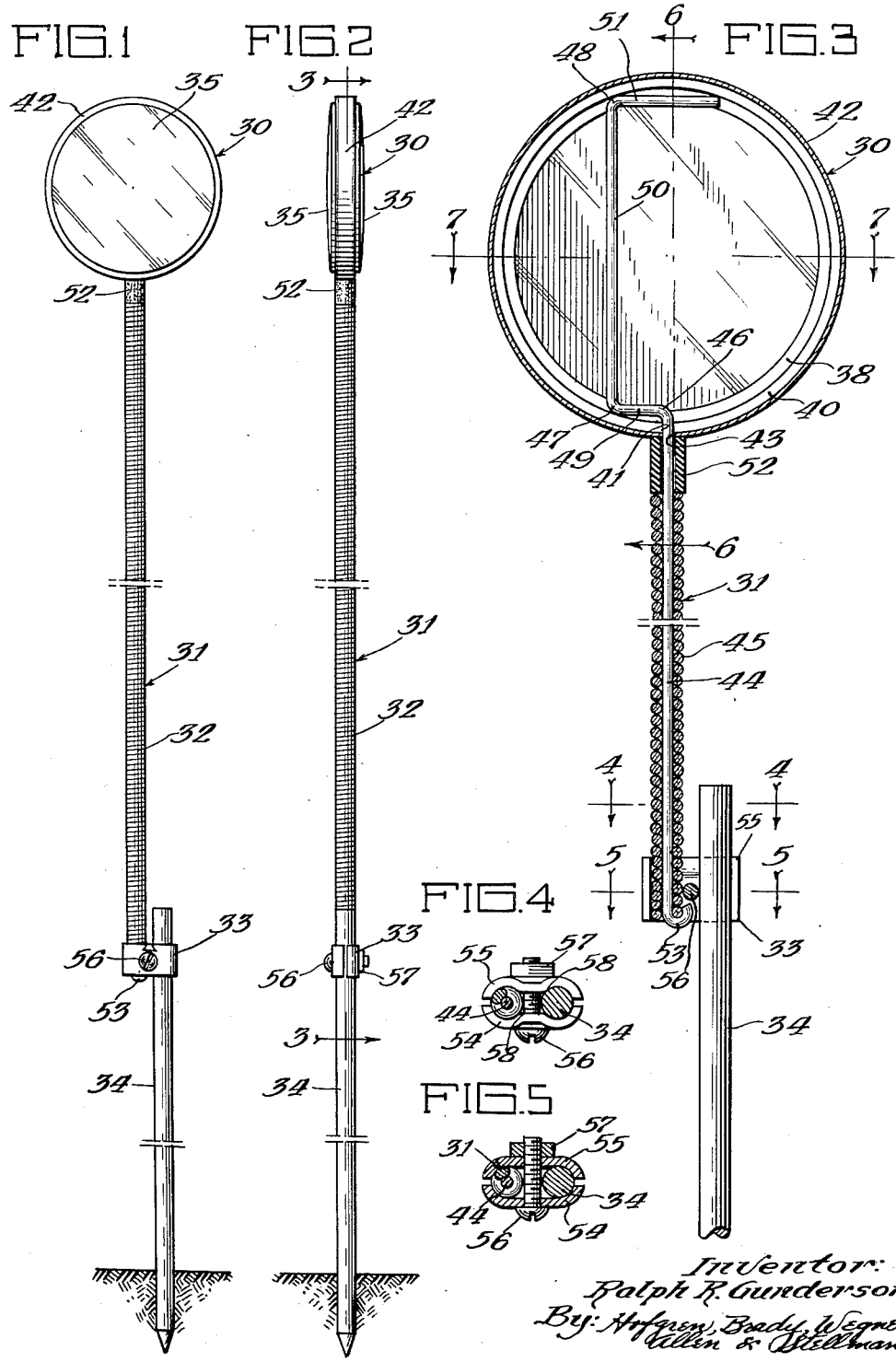
Inventor:
Ralph R. Gunderson
By: Hofgren, Brady, Wegner,
Allen & Stellman
Attorneys

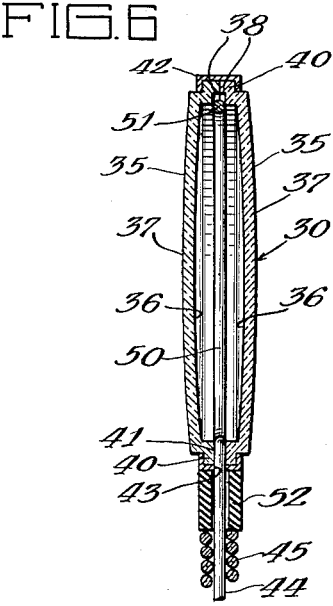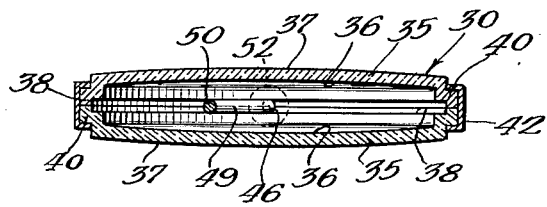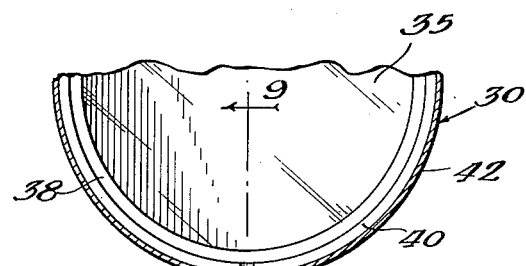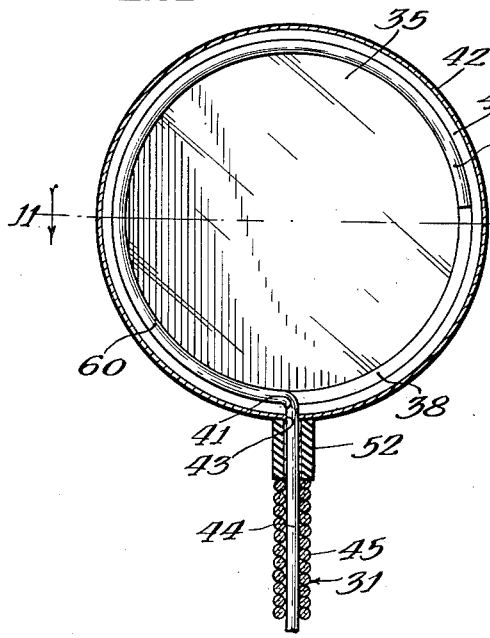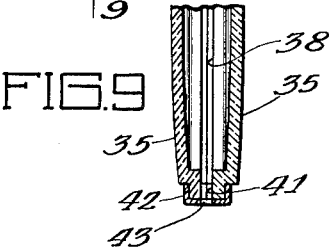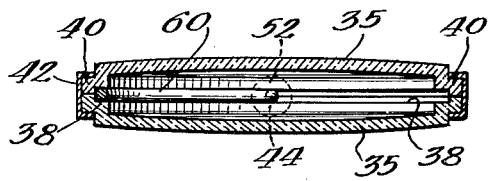

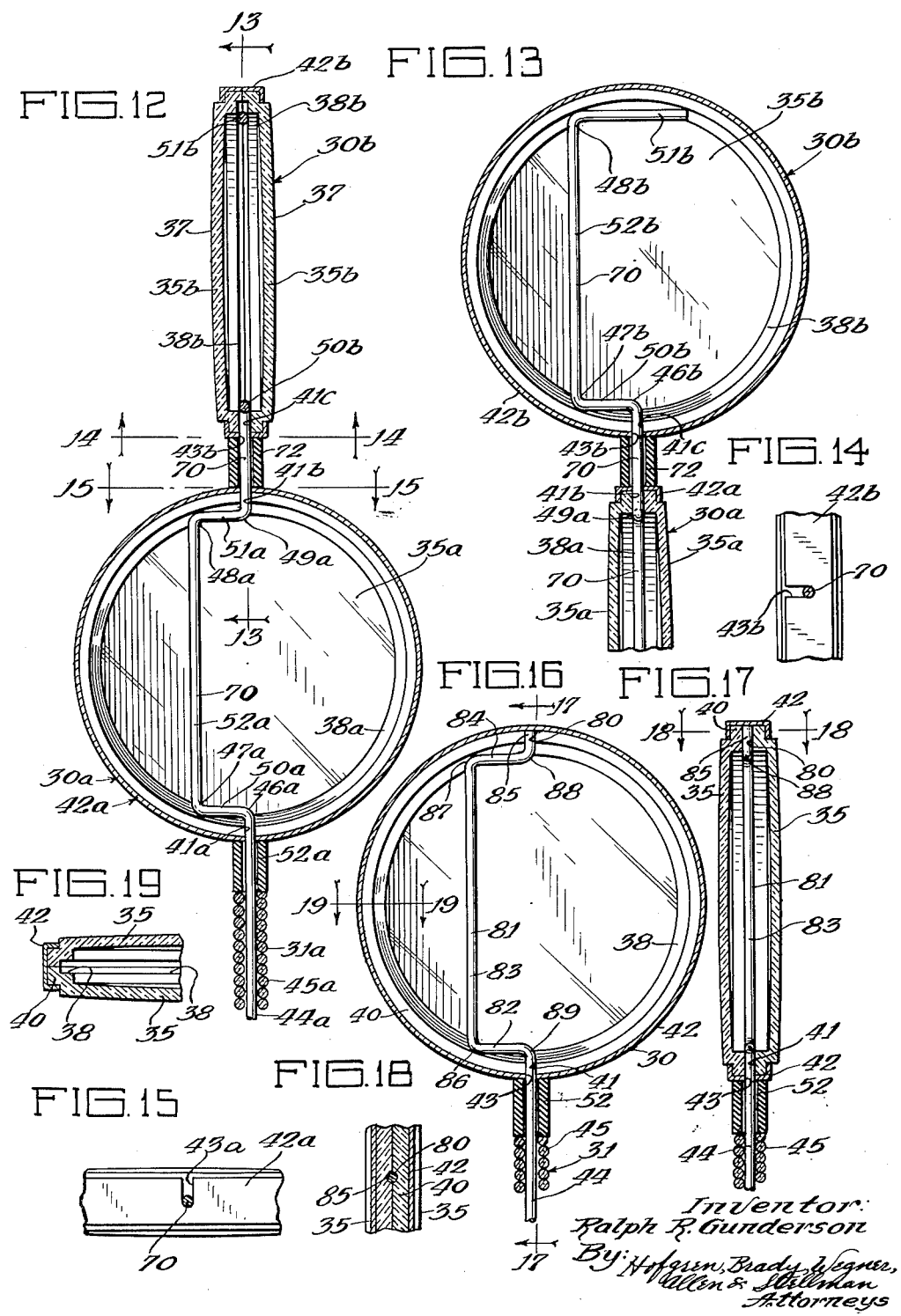

United States Patent Office 3,066,577
Patented Dec. 4, 1962

3,066,577
REFLECTING SIGNAL MARKER
Ralph R. Gunderson, 5520 South Shore Drive,
Chicago, Ill.
Filed Mar. 2, 1960, Ser. No. 12,374
8 Claims. (Cl. 88—79)

This invention relates to a reflecting signal marker of the type used to indicate the location of roadway entrances during the hours of darkness. This application is a continuation-in-part of my copending application, Serial No. 715,231, filed February 14, 1958, entitled "Signal Flare Marker," now abandoned.

The marker of the present invention provides a particularly unique and inexpensive structure for securely mounting reflecting lenses. The supporting resilient shank is securely and permanently attached internally to the reflecting lenses so as to enhance its durability and to prevent the lens structure from being disconnected from the shank by persons passing by.

The primary object of the present invention is to provide a new and improved means for securing a resilient supporting structure to a reflecting signal marker.

Another object is to provide a signal marker formed from reflecting lenses which are internally secured to an integral wire-like element forming a part of the supporting shank of the marker.

A further object is to provide a reflecting lens structure formed from a pair of reflecting lenses which are constructed to cooperatively embrace an integral non-resilient portion of a supporting shank to mount the lens structure upon the shank.

Still another object is to provide a supporting shank formed in part from a wire-like element which is adapted to extend into the interiors of a plurality of hollow lens structures to mount the lens structures upon a single supporting shank.

The invention is illustrated in a preferred embodiment in the accompanying drawings, in which:

FIG. 1 is a front elevational view of a reflecting signal marker;

FIG. 2, a side elevational view of the device in FIG. 1;

FIG. 3, an enlarged sectional view taken as indicated on line 3—3 of FIG. 2;

FIG. 4, a sectional view taken as indicated on line 4—4 of FIG. 3;

FIG. 5, a sectional view taken as indicated on line 5—5 of FIG. 3;

FIG. 6, a sectional view taken as indicated on line 6—6 of FIG. 3;

FIG. 7, a sectional view taken as indicated on line 7—7 of FIG. 3;

FIG. 8, a fragmentary view, partly in section, of the reflecting lens shown in FIG. 3 with the wire-like element removed to illustrate the grooved portion of the lens structure and the aperture in the bezel;

FIG. 9, a sectional view taken as indicated on line 9—9 of FIG. 8;

FIG. 10, a sectional view similar to the upper portion of FIG. 3, but showing a modification of the invention;

FIG. 11, a sectional view taken as indicated on line 11—11 of FIG. 10;

FIG. 12, a fragmentary sectional view of a further modification showing a pair of lens structures mounted upon the resilient shank with the reflecting faces of the lens structures being positioned at an angle of 90 degrees with respect to each other;

FIG. 13, a sectional view taken as indicated on line 13—13 of FIG. 12;

FIG. 14, a sectional view taken as indicated on line 14—14 of FIG. 12;

FIG. 15, a sectional view taken as indicated on line 15—15 of FIG. 12;

FIG. 16, a sectional view similar to the upper portion of FIG. 3, but showing a further modification of the invention;

FIG. 17, a sectional view taken as indicated on line 17—17 of FIG. 16;

FIG. 18, a sectional view taken as indicated on line 18—18 of FIG. 17; and

FIG. 19, a sectional view taken as indicated on line 19—19 of FIG. 16.

Referring to FIGS. 1 and 2 of an illustrated embodiment, a reflecting lens structure, generally designated 30, is provided with a supporting structure, generally designated 31, which may include an upper resiliently flexible shank 32 secured by an adjustable clamp 33 to a pointed metal stake 34. The stake 34 may readily be driven into the ground to support the reflecting signal marker in upright position.

Although the structure of the present invention is principally used as a driveway marker, it is also adapted for use on the highway as a warning flare. Thus it is contemplated that the end of the supporting structure (such as stake 34) may be made of a size to be conveniently anchored in the tarred portion between adjacent concrete slabs on the highway.

The lens structure 30 is preferably formed from a pair of similar plastic lenses 35. Each lens 35 may be generally circular at its periphery and may have a slightly dished inner surface 36 and an outer reflecting face 37. The inner surface 36 of each of the lenses 35 is shaped to afford an annular abutting shoulder or clamping portion 38 adjacent the periphery of the lens. Likewise, each lens 35 is provided with an outwardly extending peripheral flange 40 which preferably has a transverse groove 41 formed therein for a purpose later to be described.

When the lenses 35 are assembled, the peripheral flanges 40 of each lens 35 are placed in abutting engagement and the grooves 41 are aligned with each other to afford a peripheral aperture extending outwardly from the interior of the reflecting lens structure 30. A bezel 42, preferably of light metal, is positioned about the exposed abutting flanges 40 of each of the lenses 35 and the marginal edges of the annular bezel are spanked inwardly to firmly embrace the flanges 40 and hold the two lenses 35 in assembled relation. As best seen in FIG. 9, the bezel 42 is also provided with an opening 43 which is aligned with the aperture in the periphery of the lens structure formed by the two grooves 41.

The lens structure 30 is preferably mounted upon a resiliently flexible support for maintaining the driveway marker in upright position. To this end, the shank 32 may be formed from an elongated wire-like element 44, preferably a relatively heavy length of wire, which is closely embraced at its outer free end portion by a resiliently flexible reinforcing member 45.

As best shown in FIG. 3, the wire-like element 44 has an end portion which is passed inwardly of the reflecting lens structure 30 through the opening 43 and grooves 41 in the bezel and the lens structure, respectively. This inner end portion of the wire-like element 44 is preferably right-angularly bent at 46, 47 and 48 to form wire lengths 49, 50 and 51 affording an intermediate portion which may assume a position within the lens structure as shown in FIG. 3. The thickness of the end portion of the wire-like element 44 and the spacing between the opposed cooperating portions or shoulders 38 of the lenses is regulated so that, when the lenses 35 are secured together by the bezel 42, the shoulders 38 securely clamp offset portions or wire lengths 49 and 51, thus firmly anchoring the supporting shank 32 to the lens structure 30. The wire lengths or offset portions 49 and 51 extend transversely of the longitudinal axis of the shank in chord-like fashion, as shown in FIG. 3, so as to prevent rotation of the lens structure 30 with respect to the shank 32.

The reinforcing member 45 is preferably formed from a closely coiled wire spring, best shown in FIGS. 1 through 3, which embraces the outwardly extending end portion of the wire-like element 44 which is held firmly in place against a pliable buffer element 52 by the bent end portion 53 of the wire 44. The buffer element 52 is interposed between the upper end of the reinforcing member 45 and the lens structure 30 so that, when the shank 32 is flexed, the upwardly exerted forces will not exert excessive pressure upon the lens structure 30.

In order to adjust the height of the lens structure 30, the clamp member 33 may be provided. It is preferably formed from a pair of similar cooperating portions 54 and 55, which are apertured to receive a bolt 56 passing therethrough. The portions 54 and 55 are formed with a proper radius to snugly embrace the shank 32 and the pointed stake 34 so that the supporting structure 31 can be held in the desired position of extension when the nut 57 is drawn up tightly on the bolt 56. Preferably each of the portion 54 and 55 is inwardly struck as at 58 to give a continuous gripping radius to the clamping structure when it is in assembled relation.

In order to assemble the supporting structure 31 and the lens structure 30, the end portion of the wire-like element 44 is first passed through the opening 43 of the bezel 42. The wire lengths 50 and 51 are then placed against the shoulder 38 of one of the lenses 35 so that the wire end portion lies in the groove 41 of that lens. The other lens 35 is then similarly placed over the end portion 44a and against the first lens so that the cooperating shoulders 38 bear against and firmly hold the wire lengths 50 and 51. Finally the bezel 42 is transversely centered about the periphery with respect to the abutting lens flanges 40, and the annular marginal edges of the bezel 42 are spanked inwardly to firmly embrace the flanges 40 and hold the lenses 35 in assembled relation on the supporting structure 31.

When this form of the driveway marker is used, it is oftentimes desirable to push the stake and clamp completely into the ground so that only the shank 32 remains exposed. Since the shank is resiliently flexible and is anchored within the lens structure, the marker is extremely durable and is practically tamper-proof.

A modified showing of the invention is illustrated in FIGS. 10 and 11, and parts similar to parts in the first embodiment will be similarly designated. In this embodiment the wire-like element 44 is provided with an inwardly extending end portion 60 which is shaped generally to correspond to the configuration of the shoulders or clamping portions 38. As herein shown, the end portion 60 of the wire 44 is circularly shaped so as to continuously lie between and be gripped by the clamping portions 38 of each of the lenses 35. The lens structure 30 is thus conveniently and securely anchored again to its supporting structure 31. The assembly of the lens structure 30 on the supporting structure 31 is similar to that described in the preferred embodiment.

In FIGURES 12 through 15, a form of the invention is shown in which a plurality of lens structures are securely mounted upon a single supporting structure 31a formed similarly to supporting structure 31 and including wire-like element 44a and reinforcing member 45a. In this embodiment, as best shown in FIG. 12, the lower lens structure 30a has a pair of lenses 35a which are in most particulars identical with the lenses 35 in the preferred embodiment and separated from the supporting structure 31a by a buffer element 52a. However, each of the lenses 35a has additional corresponding grooves 41b which cooperate to form an aperture in the lens structure 30a opposite to the aperture formed by the grooves 41a. In addition, the bezel 42a is slotted at 43a (See FIG. 15) to accommodate the end portion 70 of the wire-like element 44a.

The lens structure 30b is in all particulars identical with the lens structure of the preferred embodiment except that the bezel 42b is slotted at 43b and aligned with the aperture formed by the grooves 41c so as to accommodate the end portion 70 of the wire-like element 44a.

The end portion 70 is bent right-angularly at 46a, 47a, 48a and 49a within the lens structure 30a to form wire lengths 50a, 51a and 52a. Within the lens structure 30b the end portion 70 is right-angularly bent at 46b, 47b, and 48b to form wire lengths 50b, 51b and 52b. Since the end portion 70 of the wire is integral, a connecting wire length 71 is provided which extends between the two lens structures 30a and 30b and which is embraced by a resilient buffer element 72 which bears at its opposite ends against the peripheries of the lens structures 30a and 30b.

The end portion 70 of the wire has wire lengths 50a, 51a, 50b and 51b disposed between the shoulders or clamping portions 38a and 38b of each of the lenses 35a and 35b so that the wire lengths are firmly held by the lenses when the bezels 42a and 42b are spanked into embracing relationship about the periphery of each of the lens structures 30a and 30b. It is, of course, contemplated by the structure that the end portion 70 of the wire may be angularly bent so that the lens structure 30b can be turned at a different angle axially of the supporting structure 31a so that the plane of the reflecting outer faces of each lens structure can be angularly varied as desired with respect to the plane of the faces of an adjacent lens structure. In addition, it is clear that the lens structure 30b need not be mounted axially of the supporting structure 31a, but that it can be mounted at an angle with respect to said shank by merely altering the location of the grooves 41a and bending the wire end portion 70 so that it will pass through the grooves.

A further modified showing of the invention is illustrated in FIGS. 16 through 19, and parts similar to parts in the preferred embodiment will be similarly designated. In this embodiment, the lens structure 30 may be formed identical with the lens structure of the preferred embodiment, except that each of the plastic lenses 35 has a second transverse relieved groove 80 formed in its peripheral flange 40 for a purpose which will now be described.

The supporting structure 31 includes a reinforcing member 45 embracing the wire-like element 44, and the buffer element 52 is interposed between the reinforcing member 45 and the lens structure 30 as in the preferred embodiment. The wire-like element 44 preferably has an end portion 81 which is passed inwardly of the reflecting lens structure 30 through the opening 43 in the bezel 42 and through the grooves 41 in the peripheral flanges 40 of each of the lenses 35. The end portion 81 may be bent as shown in FIG. 16 to form internal wire lengths 82, 83, 84 and 85. The wire length 85 is positioned within the lens structure 30 so that it lies snugly in the transverse grooves 80. Thus, when the lenses 35 are secured together by the bezel 42, the transverse grooves 80 in the flanges 40 of each of the lenses 35 fit snugly about the wire length 85, and the opposed shoulders 38 of each of the lenses 35 securely clamp the end portion 81 at 86, 87, 88 and 89 to firmly anchor the supporting structure 31 to the lens structure 30.

The foregoing detailed description is given for clearness of understanding only and no unnecessary limitations should be understood therefrom, for some modifications will be obvious to those skilled in the art.

I claim:

1. A reflecting signal marker, comprising: a light reflecting lens structure formed from a pair of similar disclike lenses each generally rounded in its peripheral edge and having an inner surface and an outer reflecting face, said lenses being positioned with their peripheral edges in abutment so that the inner surfaces are in opposed spaced relation and the reflecting faces are oppositely directed outwardly, each of said inner surfaces being provided peripherally with opposed spaced abutting portions; a supporting shank for retaining the lens structure in operative position, said shank including a length of relatively stiff wire having one end extending through the lens structure and between the pair of lenses and being formed to provide spaced wire portions each extending transversely of the longitudinal axis of the shank, the wire portions each being positioned between a pair of opposed abutting portions and being joined by a chord-like segment of the wire; and means for embracing the peripheries of the lenses to hold the opposed pairs of abutting portions closely adjacent the opposite sides of the wire portions to prevent rotation of the lens structure with respect to the shank.

2. A reflecting signal marker, comprising: a light reflecting lens structure formed from a pair of similar lenses each having an inner surface and an outer reflecting face, said lenses being positioned with their inner surfaces adjacent each other so that their reflecting faces are oppositely directed outwardly, each of said inner surfaces being provided with opposed peripheral clamping shoulders and having a peripheral groove, which grooves when placed adjacent each other form a peripheral aperture in said lens structure; a supporting shank for retaining the lens structure in operative position, said shank including a length of relatively stiff wire having one end extending through said aperture into the lens structure, said one end being formed to provide spaced wire portions each positioned opposite the other within the lens structure and between the clamping shoulders and each being joined by a transverse segment of the wire; and a bezel embracing the peripheries of the lenses to retain said shoulders in clamping engagement against said wire portions to prevent rotation of the lens structure with respect to said shank, said bezel having an opening to accommodate said one end of the wire passing through the peripheral aperture in to the interior of the lens structure.

3. A reflecting signal marker, comprising: a pair of light reflecting lens structures each formed from a pair of lenses having an inner surface and an outer reflecting face, each of said pairs of lenses being positioned with their inner surfaces adjacent each other so that their reflecting faces are directed outwardly, each of the inner surfaces being provided with opposed abutting portions; a supporting shank for retaining the lens structures in operative position, said shank including a length of relatively stiff wire having one end extending into the first lens structure and outwardly thereof into the second lens structure, said one end having offset wire portions positioned between the abutting portions of the pair of lens structures; and means for securing each of the pairs of lenses together to hold the opposed abutting portions of the inner surfaces on opposite sides of the wire portions of said one end of the wire to secure the shank and the two pairs of lenses in assembled relation and to prevent rotation of the lens structures with respect to the shank and to each other.

4. A reflecting signal marker as specified in claim 3, in which the one end of the wire extends axially of the shank through the first lens structure and into the second lens structure so as to support the pair of lens structures in axial relation.

5. A reflecting signal marker, comprising: a light reflecting lens structure formed from a pair of lenses each having an inner surface and an outer reflecting face, said lenses having peripheral marginal edges positioned in abutting contact so that the inner surfaces are in opposed relation and the reflecting faces are directed outwardly, said lens structure being provided with an aperture extending from the interior outwardly to the exterior surface of the lens structure; a supporting shank for retaining the lens structure in operative position, said shank including a wire-like element at one end extending through said aperture in the lens structure and between the inner surfaces of the pair of lenses, the wire-like element being bent angularly within the lens structure to provide an offset portion extending laterally of the longitudinal axis of said shank; and means for securing the pair of lenses together to position said inner surfaces of the pair of lenses on opposite sides of the offset portion to secure the shank and the lenses in assembled relation and to prevent rotation of the lens structure with respect to said shank.

6. A reflecting signal marker, comprising: a light reflecting lens structure formed from a pair of lenses each having an inner surface and an outer reflecting face, said lenses being positioned with their peripheral edges in abutment so that their inner surfaces are adjacent each other and their reflecting faces are oppositely directed outwardly, each of said inner surfaces being provided with opposed abutting portions; a supporting shank for retaining the lens structure in operative position, said shank including a wire-like element at one end extending into the interior of the lens structure and between the opposed abutting portions, said one end being bent angularly to provide a pair of spaced laterally extending offset portions each positioned between the opposed abutting portions; and means for securing the pair of lenses together to hold the opposed abutting portions on opposite sides of the pair of offset portions to secure the shank and the lenses in assembled relation and to prevent rotation of the lens structure with respect to the shank.

7. A reflecting signal marker as specified in claim 6 in which the offset portions are each positioned adjacent the periphery of the lens structure and on opposite sides thereof, the offset portions being joined by a transversly extending segment of the wire-like portion.

8. A reflecting signal marker, comprising: a light reflecting lens structure formed from a pair of lenses each having an inner surface and an outer reflecting face, said lenses having peripheral marginal edges positioned in abutting contact so that the inner surfaces are in opposed relation and the reflecting faces are directed outwardly, said lens structure being provided with an aperture extending from the interior outwardly to the exterior surface of the lens structure; a supporting shank for retaining the lens structure in operative position, said shank including a wire-like element at one end extending through said aperture in the lens structure and between the inner surfaces of the pair of lenses, the wire-like element having segments angularly disposed with respect to one another within the central plane of the two lenses, at least one of the segments extending in a chord-like direction across the interior of the lens structure; and means for securing a pair of lenses together to position the inner surfaces of the pair of lenses on opposite sides of the segments of the wire-like element to secure the shank and the lenses in assembled relation and to prevent rotation of the lens structure with respect to the shank.

References Cited in the file of this patent

UNITED STATES PATENTS

| | | |
|---|---|---|
| 2,050,579 | Murray | Aug. 11, 1936 |
| 2,155,992 | Menachof | Apr. 25, 1939 |
| 2,361,287 | Gustin | Oct. 24, 1944 |